INVENTORS
JEAN PENNEL
JOSEPH FLIPO
BY Richards & Geier
ATTORNEYS

Patented June 20, 1939

2,163,289

UNITED STATES PATENT OFFICE 2,163,289

SPONGE RUBBER COATED FABRIC AND METHOD OF MANUFACTURING THE SAME

Jean Pennel, Roubaix, and Joseph Flipo, Croix, France

Application December 1, 1936, Serial No. 113,570
In France June 4, 1932

5 Claims. (Cl. 91—70)

This invention relates to sponge rubber coated fabrics and to methods of manufacturing the same.

The present application is a continuation in part of our co-pending patent application filed June 2, 1933, Serial No. 673,998.

Sponge rubber is generally made by mixing a mass of crude and masticated rubber with substances capable of developing gases when subjected to heat, or by introducing gases under pressure into the rubber. Then the rubber composition is cut into sheets or pieces of suitable dimensions which are placed in molds between the plates of a press or in an autoclave, whereby the walls of the mold or the steam pressure within the autoclave regulate and limit the expansion of the gases within the rubber, so that sponge rubber of predetermined dimensions and shape is produced.

Our preferred method of providing layers of sponge rubber of this type on fabrics of all kinds, carpets, cardboard, paper, leather and the like comprises the steps of mixing rubber with sulphur, accelerators, blowing agents, plasticizers, fillers and coloring material, calendering the mixture on the web at a temperature lower than that at which the swelling agent commences to be liberated and festooning the sheet in an oven so that the rubberized fabric will gradually be warmed through the swelling and vulcanizing temperature range.

We found that the practical realization of the above and similar methods of providing sponge rubber coatings presents certain difficulties and drawbacks.

One of these drawbacks is that in prior art processes, particularly those wherein latex is employed, charging agents, coloring substances and the like must be added to the rubber mass in predetermined quantities which can be varied only within a narrow range. Furthermore, charging agents of special type must be used in connection with those processes.

The process wherein a mixture containing dry rubber is calendered and then vulcanized in hot air and under atmospheric pressure has the disadvantage that the calendering must be carried out at a temperature which is lower than that at which the blowing agent contained in the rubber mixture begins to decompose. Ammonia bicarbonate which is generally used as a blowing agent has a decomposition temperature which is as low as 70° C. In order to avoid exceeding this temperature during the calendering the rubber must be previously made plastic, either by a prolonged mastication, or by the addition of plastifying agents or some other method.

The necessity of maintaining the layer of the rubber mixture in a very plastic state up to the vulcanization is very inconvenient since the soft rubber cannot be supported anymore upon the surface of the fabric or other material. If the sheet of fabric is vulcanized in a vertical position the rubber will slowly flow downward forming pockets or flaws which destroy the uniformity of the swelling operations and may spoil the article entirely.

Furthermore, the bubbles formed in the course of the swelling process may break and collapse since the walls of these bubbles are not sufficiently strong to resist pressure exerted upon them until the vulcanization has been completed and the material hardened.

A suggestion has been made to eliminate this drawback by maintaining the rubber-coated sheet in a horizontal position during the vulcanization and thus avoid the flowing of the rubber layer. This however, is disadvantageous in that the length of the article which can be manufactured is considerably limited. Furthermore, it is not possible to obtain a fabric which is coated on both sides with sponge rubber by vulcanizing it in a horizontal position, since the lower layer of the rubber mixture would flow in the course of the vulcanization.

Consequently, by using processes known heretofore, it was not possible to manufacture on a commercial scale a fabric coated by layers of sponge rubber, with the exception of fabrics carrying extremely thin layers of rubber. In the latter case surface tension or molecular attraction prevent the flowing of the rubber relatively to the fabric.

However, in the case of very thin rubber layers the swelling of the rubber produces very small and isolated cells so that the manufactured article is not, properly speaking, sponge rubber.

An object of the present invention is to eliminate these drawbacks and to provide a process through the use of which it is possible to manufacture a fabric coated on one or both sides by substantially thick layers of sponge rubber.

Another object is to eliminate the flowing of rubber and to make it possible to vulcanize very large sheets of fabric in vertical positions.

A further object of the present invention is the provision of a process by means of which it is possible to obtain in one single operation layers of sponge rubber of thicknesses varying, for example, between .2 millimeter and 20 millimeters.

A still further object is the provision of a multicolored sponge rubber layer or a sponge rubber layer which has the appearance of marble.

A further object is the provision of a method of superposing layers of sponge rubber of different colors, shades and consistency.

A further object is the provision of a sponge rubber coating the outer surface of which has the appearance of projecting granules, such coating being particularly suitable for wearing apparel and morocco-trade.

Another object of the present invention is the provision of a method of manufacturing sponge rubber containing charging agents, coloring matter and other substances, the relative amounts of which, as added in the course of the manufacture, may vary within a very wide range.

The present invention is based on the discovery that the flowing of the sponge rubber layers may be avoided by coordinating the processes of vulcanization and of swelling. The rubber mixture, at the time of the swelling, should be of sufficient hardness to avoid the flow of the mixture, and yet it should not be too hard so as not to interfere with the swelling process and the formation of the gas cells.

In order to attain the desired results it is also necessary to extend the duration of the vulcanization process. Since vulcanization is a chemical reaction it usually takes place much faster than the swelling which is a physical process. The swelling process takes usually a comparatively long time since it is necessary for the gases to overcome the forces of inertia.

The above and other objects of the present invention may be realized by a method which comprises the simultaneous use of two accelerators, one of which is active at a substantially low temperature and is used in small quantities which are insufficient to entirely vulcanize the rubber layer. This accelerator makes the rubber mass harder without bringing it into the state of polymerization in which it would be incapable of changing its form anymore at that temperature. The second accelerator is one which is active at a higher temperature, namely at the time when the rubber mixture has already passed through the swelling stage and has attained its final form.

Due to the progressive increase in temperature the second accelerator acts after the first one and completes the vulcanization of the rubber mixture.

One of the important features of the present invention is, therefore, the use of two accelerators acting one after the other for the purpose of prolonging the vulcanization period and causing the vulcanization and swelling processes to be carried out simultaneously, and thereby avoiding the flowing of the rubber mass.

Since many accelerators, or pairs of accelerators, will not produce the desired results, the election of the proper accelerators is of great importance. This selection depends primarily upon that of the blowing agent, since it is advisable that the first, more rapid accelerator should become active shortly after the beginning of the swelling. When making the selection it must also be considered that the second accelerator can have an energizing effect upon the first accelerator and thereby lower the temperature of vulcanization.

As the main blowing agent we prefer to use ammonia bicarbonate which begins to decompose and form gases at a temperature of 70° C. Consequently the swelling of the rubber mixture containing ammonia bicarbonate will begin at approximately the same temperature. Then it is necessary to select such accelerators that the vulcanization will commence at about 80° C. or 85° C.

We have found after considerable experimentation that as the first, more rapid accelerator, it is advisable to use one belonging to the group of tuads or thiourea, provided that the second accelerator used is one belonging to the group of mercaptans.

It is also necessary to carefully determine the amount of accelerators used in order that the first accelerator should not produce a too strong vulcanization. The total amount of the two accelerators may be about 0.6% of the entire gum in the rubber mixture. It should be noted, however, that the proper selection of the amount of the accelerators in the rubber mixture is also dependent upon the relation of the amount of the gum to the amount of the total mixture.

As already stated the amount of the first accelerator used should be such that it will not be able to produce complete vulcanization. In fact it is advisable to use about one-third or one-fourth of that amount of the first accelerator by means of which complete vulcanization may be obtained.

As already stated, the accelerators are added to the rubber mixture shortly before the calendering. The calendered rubber layer is gradually heated, the swelling and the vulcanization taking place as the result of this heat treatment.

When described accelerators are used in stated quantities the vulcanization takes place progressively between the temperatures of 85° C. and 135° C.

It is evident that the temperatures used in the course of the heating process and the extent of this heating process depend upon the swelling temperature and the action of the two selected accelerators.

In general the temperature should not rise too rapidly or too slowly in order that each change in the physical structure of the mixture should have time to develop fully and should not be affected by various subsequent reactions.

It is easily possible for an operator to plot a temperature curve for each individual case, provided that all necessary data are given. Such curve should preferably comprise intervals of about 10 or 15 minutes each during which a uniform temperature is maintained. The proper temperatures of the heating process should be determined by taking under consideration the chemical inertia of the products, the degree of plasticity of the rubber mass and the time required for distributing the temperature equally throughout the interior of the mass.

By way of example the following data may be given:

A rise of temperature of the rubber mass from 25° C. to 70° C. should take place in 13 minutes.

A rise of temperature from 70° C. to 110° C. should take place in 30 minutes.

A rise of temperature from 110° C. to 135° C. should take place in 20 minutes.

Obviously, the periods of time and temperatures should be changed to suit the individual requirements.

In the course of the heating process the swelling will commence usually at about 70° C. The flowing agents will begin to decompose at that temperature and will continue to develop gases until a temperature of about 80° C. or 85° C.

Then a slight swelling and a slight softening of the mass will take place. Vulcanization begins at about 85° C. and continues simultaneously with the increasing swelling and the increasing pressure of the gases.

In general, through the use of the described process, the swelling is completed in about one hour and the flow of the rubber or the formation of pocket flaws or tears, in the rubber coating is effectively prevented.

The invention will appear more clearly from the following detailed description when taken in connection with the accompanying drawings showing by way of example, preferred embodiments of the inventive idea.

As already stated, the process comprises three main operations which are: the preparation of the mixture, the calendering and the vulcanising.

To prepare the mixture, the dry gum is first treated in a mixer in the usual manner and then plastifying agents, coloring materials, adjuvants and blowing agents are added to it; the latter must be added at a temperature which is lower than that at which their decomposition begins, such as 70° C. in case of ammonia bicarbonate. The accelerators are added to the mixture just prior to the calendering at a temperature which also should be lower than the decomposition temperature.

The following examples of a rubber mixture are given by way of illustration only. The contents of these mixtures may be varied whenever necessary to suit individual requirements.

*First example*

This mixture may be used for obtaining colored sponge rubber layers of soft consistency:

| | |
|---|---|
| Gum, smoked rubber | 50 |
| Plastifying agents: | |
|   Palm oil | 4 |
|   Vaseline | 2 |
| Adjuvants, etc. | |
|   Zinc oxide | 4 |
|   Chalk | 30 |
|   Coloring matters | 8 |
| Sulphur | 1 |
| Accelerators | |
|   Thionex (thiourea monosulfide) | 0.3 |
|   Captax (mercaptobenzothiazol) | 1 |
| Blowing agent, ammonia bicarbonate | 6 |

*Second example*

Mixture used for obtaining white substantially firm sponge rubber.

| | |
|---|---|
| Gum, crepe first-latex | 50 |
| Plastifying agents | |
|   Palm oil | 3 |
|   Vaseline | 3 |
| Adjuvants, etc. | |
|   Zinc oxide | 6 |
|   Lithopone | 20 |
|   Ultramarine | 0.2 |
|   Barium sulphate | 16 |
| Accelerators. | |
|   Tetrone A (Thiuram tetrasulfide) | 0.4 |
|   Zenite (Captax zinc salt) | 1.25 |
| Blowing agent, ammonia bicarbonate | 3 |

Figure 1:
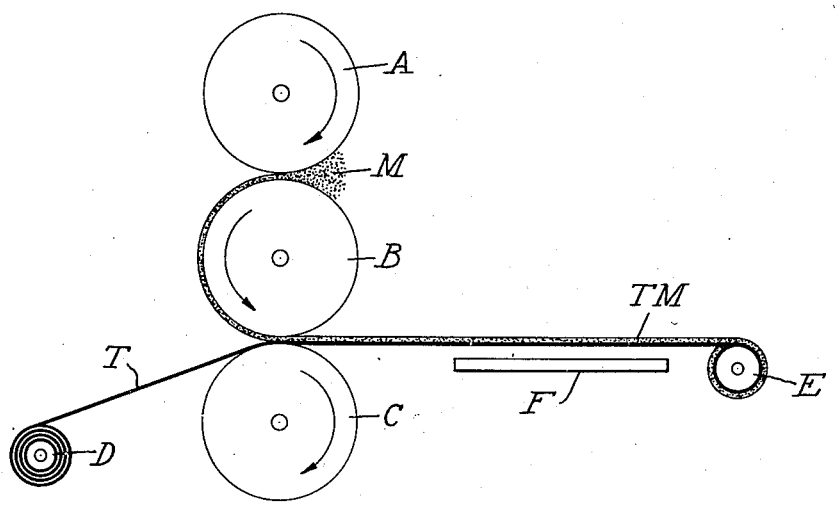
Figures 1 and 2 are diagrams showing the apparatus employed for the calendering and vulcanization operations, respectively.

The calendering of the above or similar mixtures is carried out first by softening the mixture and then placing it at M (Fig. 1) between the top cylinders or rollers A and B. The rubber mixture is drawn in and rolled between these two rollers, the temperature of which must be suitably regulated and must remain below the swelling point. The rubber mixture forms a film the thickness of which may be varied by varying the space between the rollers A and B. This space may vary, for example, between 0.05 mm. and 5 mm.

The speed of the rollers is regulated in such manner that the rubber mixture film winds itself around the middle cylinder B. Then the fabric T or the like which has the form of a band and which is wound over the roller D behind the calender is passed between the two cylinders B and C. The fabric or support T may be of different widths or thickness. The distance between the cylinders B and C is so adjusted that they will exert a pressure upon the fabric or support which will cause the film of rubber mixture to adhere to it. The fabric T carrying the rubber layer M is moved over a talcing table F and is wound upon a roller E.

Then the fabric is cooled for a predetermined period of time.

Figure 2:
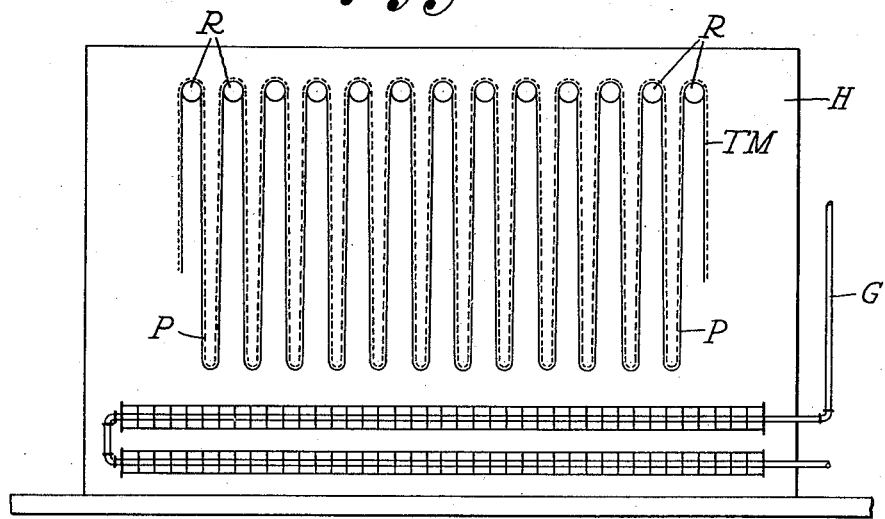

Thereupon the vulcanization operation is carried out by arranging the material in folds in a hot air oven (Fig. 2) consisting of a heat insulating chamber H provided with steam pipes G which heat the chamber to the desired temperature. This type of oven makes it possible to vulcanize a large quantity of rubber-coated fabric in one single operation, the fabric being arranged upon rollers R in the form of folds P. Then the doors and other apertures of the oven are closed and the chamber H is gradually heated in accordance with a time-temperature curve which may be determined experimentally in advance.

It is advisable to carry out this heating in the chamber H in three phases with a pause after each phase.

The following time-temperature relationship was found to be suitable for the mixture described in the first example:

First phase: temperature increased to 70° C. in 20 minutes.

Second phase: temperature increased from 70° C. to 110° C. in 35 minutes.

Third phase: temperature increased from 110° C. to 135° C. in 30 minutes.

As a result of this treatment the mixture increases from five to six times in volume. The finished product is of soft spongy consistency and has large open pores.

The following treatment was found to be suitable for the mixture described in the second example:

First phase: temperature increased to 70° C. in 15 minutes.

Second phase: temperature increased from 70° to 110° C. in 20 minutes.

Third phase: temperature increased from 110° C. to 135° C. in 15 minutes.

The mixture increases from three to four times in volume as a result of this treatment.

This finished product is rather firm and has a number of small isolated pores.

Figures 3 to 9 of the drawings illustrate several sponge rubber coated fabrics manufactured in accordance with the described or similar methods.

Figure 3:
Figures 3 to 9 are sections through articles manufactured in accordance with the principles of the present invention.

Figure 3 shows a fabric T covered by a layer of cellular or sponge rubber C' the thickness of which may vary between 0.2 millimeter and 20 millimeters.

Figure 4:

Figure 4 shows a fabric T one of the surfaces of which is covered by a layer of sponge rubber C' while its other surface is covered by a layer of plain rubber c'.

Figure 5:

Figure 5 shows a fabric T the two surfaces of which are covered by layers of sponge rubber C'. Obviously, the two layers may be of the same or different thicknesses.

Figure 6:
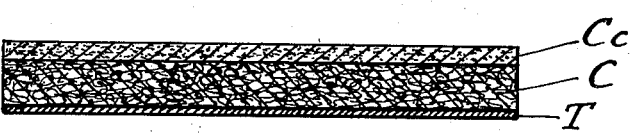

Figure 6 shows a fabric T one of the surfaces of which is coated by a plurality of layers C' c'. Each of these layers may consist of a layer of sponge rubber of the same or different consistency than another layer of sponge rubber. It is also possible to combine a layer of sponge rubber with one or more layers consisting of plain rubber.

Figure 7:
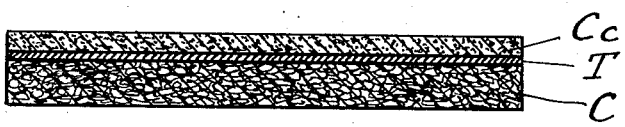

Figure 7 shows a fabric T one of the surfaces of which is covered by a layer of sponge rubber C', while the other surface is coated by one or more layers C' c' consisting of sponge rubber which may be of the same or different consistency as the layer of sponge rubber C'.

Figure 8:

Figure 8 shows two fabrics T and T' which are interconnected by a layer of sponge rubber C' of any desired consistency.

Figure 9:
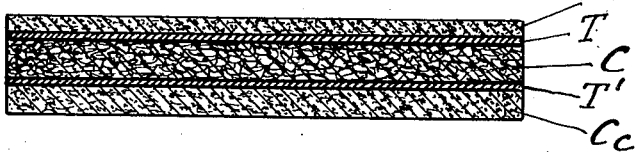

Figure 9 shows two fabrics T and T' the inner surfaces of which are interconnected by a layer of sponge rubber C' while their outer surfaces are coated by one or more layers C' c' consisting of plain or sponge rubber of the same or different nature than the layer or sponge rubber C'.

Sponge rubber used in all these articles may be of different grain structure or consistency. These variations may be obtained by changing the composition of the grain mixture, by varying the methods of manufacture or by varying the period of time during which the article is cooled between the calendering and the vulcanization.

By the described methods it is possible to eliminate the use of molds, presses, autoclaves and the like and to manufacture on a commercial scale sponge rubber coated fabrics of great length and width, the layers of sponge rubber being uniform, of any desired thickness and devoid of any flaws or pockets.

Several changes may be made in the described invention within the scope of the appended claims. For example, accelerators of any type may be used, provided that the chemical reactions of the accelerators are such that the temperatures of the vulcanization of the rubber mixture will correspond to those at which the swelling agent will be decomposed. Accelerators which have been previously mixed, may be added in the form of such mixture to the rubber mixture. The important feature in the selection of the accelerators is the possibility of regulating the vulcanization, so that it is carried out progressively and simultaneously with the swelling, thereby avoiding the flowing of soft rubber along its support, which otherwise might take place between the swelling and the vulcanizing operations.

What is claimed is:

1. The method of manufacturing a sponge rubber coated fabric and the like, which comprises adding a swelling agent to a rubber mixture, said swelling agent developing a gas within a predetermined range of temperatures adding to the mixture at least one accelerator the critical temperature of which is situated within said range of temperatures, applying the mixture in the form of at least one layer upon a pliable sheet and simultaneously calendering it, and then heating the mixture in three separate stages from a temperature which is lower than 70° C. to a temperature of about 135° C. to cause a swelling and a vulcanization thereof, whereby said swelling and said vulcanization take place substantially simultaneously.

2. The method of manufacturing a sponge rubber coated fabric and the like, which comprises adding a swelling agent to a rubber mixture, said swelling agent developing a gas within a predetermined range of temperatures, adding to the mixture at least one accelerator the critical temperature of which is situated within said range of temperatures, applying the mixture in the form of at least one layer upon a pliable sheet and simultaneously calendering it, suspending said sheet substantially vertically, and then heating the mixture by heat exchange with a heated gas in three different stages, first to about 70° C., then to about 110° C., and finally up to about 135° C. to cause a swelling and a vulcanization thereof, whereby said swelling and said vulcanization take place substantially simultaneously, and a flowing of the mixture relatively to said support is avoided, and whereby large sheets coated by sponge rubber layers having a thickness ranging between 0.2 millimeter and 20 millimeters may be produced.

3. The method of manufacturing a sponge rubber coated fabric and the like, which comprises adding a swelling agent to a rubber mixture, said swelling agent developing a gas within a predetermined range of temperatures, adding two accelerators to the mixture, the critical temperature of one of said accelerators being substantially lower than the critical temperature of the other one of said accelerators, the critical temperatures of both of said accelerators being situated within said range of temperatures, applying the mixture in the form of at least one layer upon a support, suspending the coated support, heating it up to about 70° C., then heating it to about 110° C., and finally heating it to about 135° C. to cause a swelling and vulcanization of said layer, whereby said swelling and said vulcanization take place substantially simultaneously and a flowing of said layer relatively to said support is avoided.

4. The method of manufacturing a sponge rubber coated fabric and the like, which comprises mixing ammonia bicarbonate with rubber gum, a plastifying agent and a charging agent, adding thiuram tetrasulfide and mercaptobenzothiazole zinc salt to the mixture, applying the mixture in the form of at least one layer upon a support at a temperature lower than 70° C., suspending the coated support, and then heating it in three separate stages to at least 135° C. to cause a swelling and vulcanization of said layer.

5. The method of manufacturing a sponge rubber coated fabric and the like, which comprises mixing ammonia bicarbonate with rubber gum, a plastifying agent and a charging agent, adding an accelerator belonging to the group consisting of tuads and thiourea, adding another accelerator belonging to the group consisting of mercaptans, applying the mixture in the form of at least one layer upon a support at a temperature lower than 70° C., suspending the coated support, and then heating it in three separate stages to at least 135° C. to cause a swelling and vulcanization of said layer.

J. PENNEL.
J. FLIPO.